(12) United States Patent
Lacombe et al.

(10) Patent No.: US 6,189,978 B1
(45) Date of Patent: Feb. 20, 2001

(54) SPOKE FOR CYCLE WHEEL, CYCLE WHEEL, AND MANUFACTURING METHOD

(75) Inventors: Jean-Pierre Lacombe, Mercellaz Albanais; Jean-Pierre Mercat, Saint Trivier sur Moignans, both of (FR)

(73) Assignee: Mavic S.A., Saint Trivier sur Moignans (FR)

( * ) Notice: Under 35 U.S.C. 154(b), the term of this patent shall be extended for 0 days.

(21) Appl. No.: 09/132,903

(22) Filed: Aug. 12, 1998

(30) Foreign Application Priority Data

Aug. 13, 1997 (FR) .................................................. 97 10462

(51) Int. Cl.⁷ ...................................................... B60B 1/00
(52) U.S. Cl. .............................................. 301/104; 301/58
(58) Field of Search ................................. 301/55, 58, 59, 301/61, 104

(56) References Cited

U.S. PATENT DOCUMENTS

| | | | | |
|---|---|---|---|---|
| 476,433 | * | 6/1892 | Vetterlein | 301/58 |
| 648,426 | * | 5/1900 | Olund et al. | 301/59 X |
| 1,135,869 | * | 4/1915 | Weidner | 301/59 X |
| 1,286,065 | * | 11/1918 | Murray | 301/58 |
| 5,494,337 | | 2/1996 | Behnke | 301/59 |
| 5,626,401 | * | 5/1997 | Terry, Sr et al. | 301/104 X |

FOREIGN PATENT DOCUMENTS

| | | | | |
|---|---|---|---|---|
| 120925 | * | 1/1931 | (AT) | 301/59 |
| 37321 | | 10/1886 | (DE) . | |
| 648429 | | 7/1937 | (DE) . | |
| 4306592 | | 9/1994 | (DE) . | |
| 2324471 | * | 4/1977 | (FR) . | |
| 2526374 | | 11/1983 | (FR) . | |
| 16482 | * | 9/1892 | (GB) | 301/104 |
| 4388 | * | 2/1897 | (GB) | 301/104 |
| 25596 | * | 12/1898 | (GB) | 301/59 |

* cited by examiner

Primary Examiner—Russell D. Stormer
(74) Attorney, Agent, or Firm—Greenblum & Bernstein, P.L.C.

(57) ABSTRACT

A metal spoke for a cycle wheel having a tapered body and two ends respectively for the fastening to a hub and a rim. The tapered portion of the spoke is smooth and exempt from threading over its entire length; the spoke has at each of its ends an enlarged head; and a recessed fastening screw is mounted in free rotation between the two enlarged heads. The spoke is made from a light alloy shaped in the annealed state, then heat treated by tempering. The invention also relates to a wheel having a rim, a hub and spokes.

29 Claims, 4 Drawing Sheets

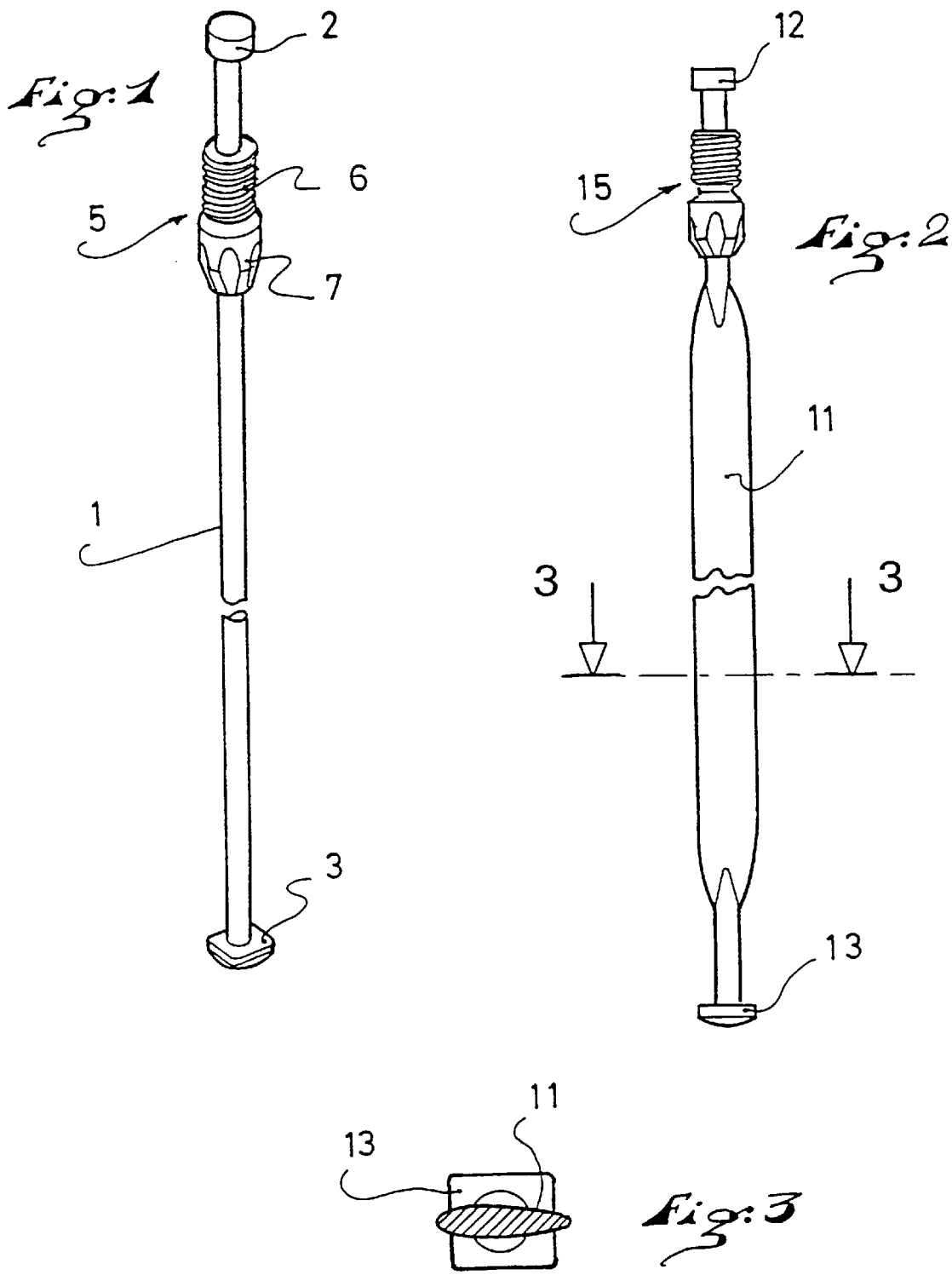

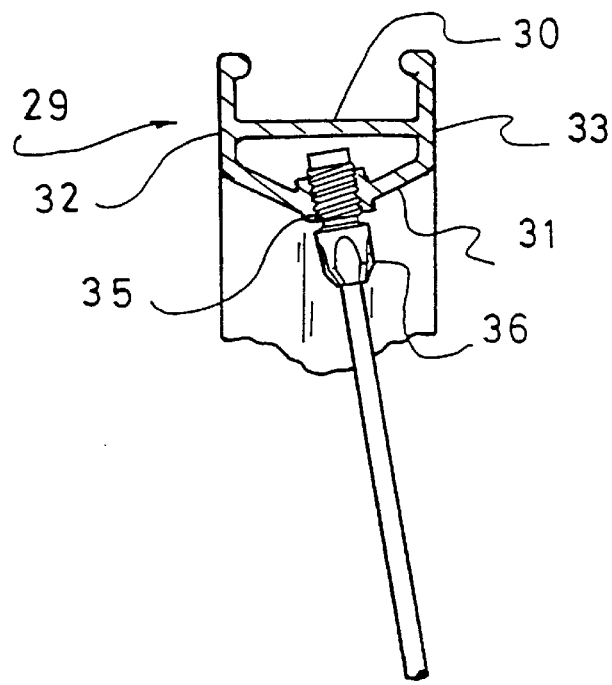
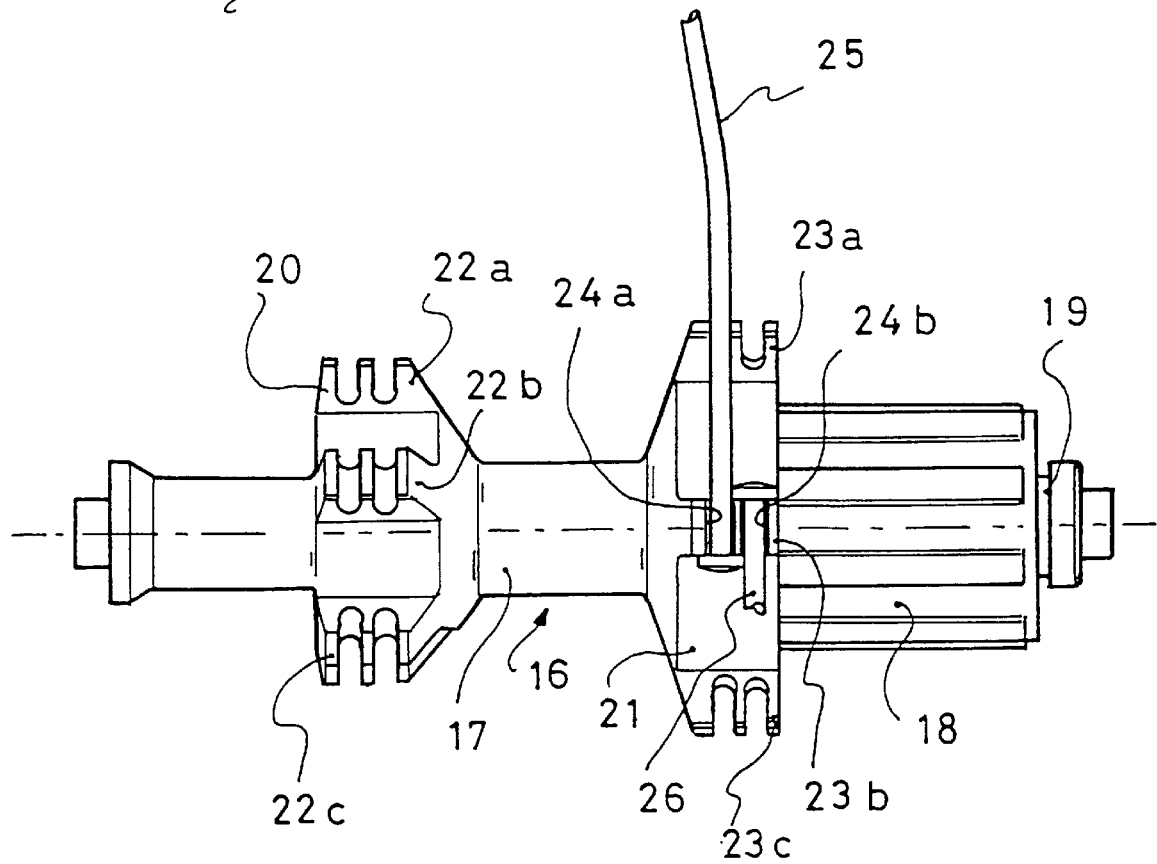
Fig. 4

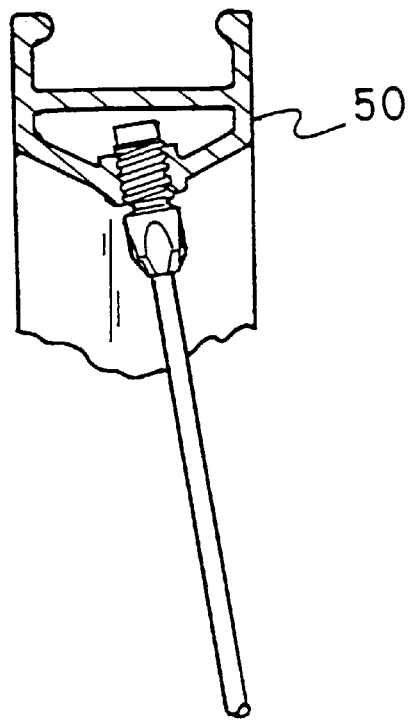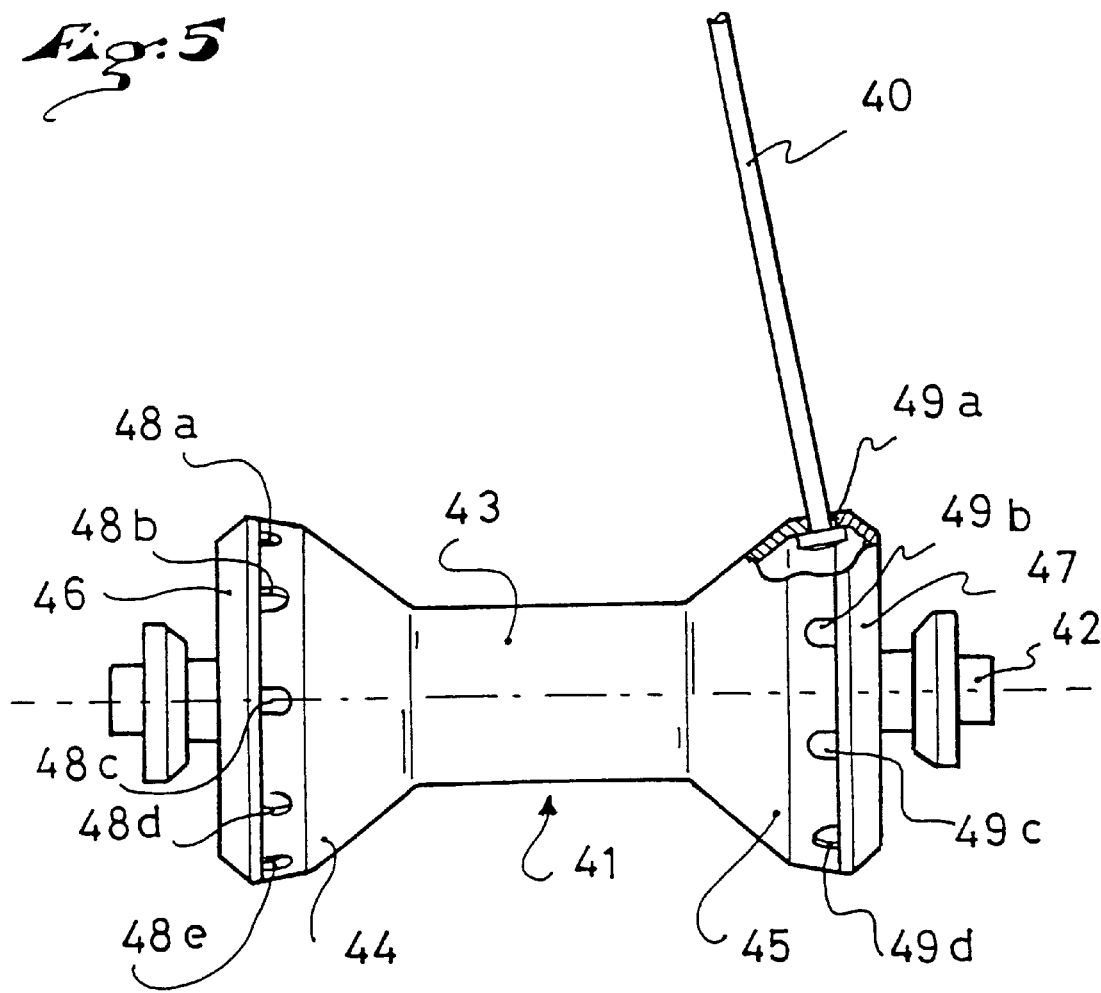
Fig. 5

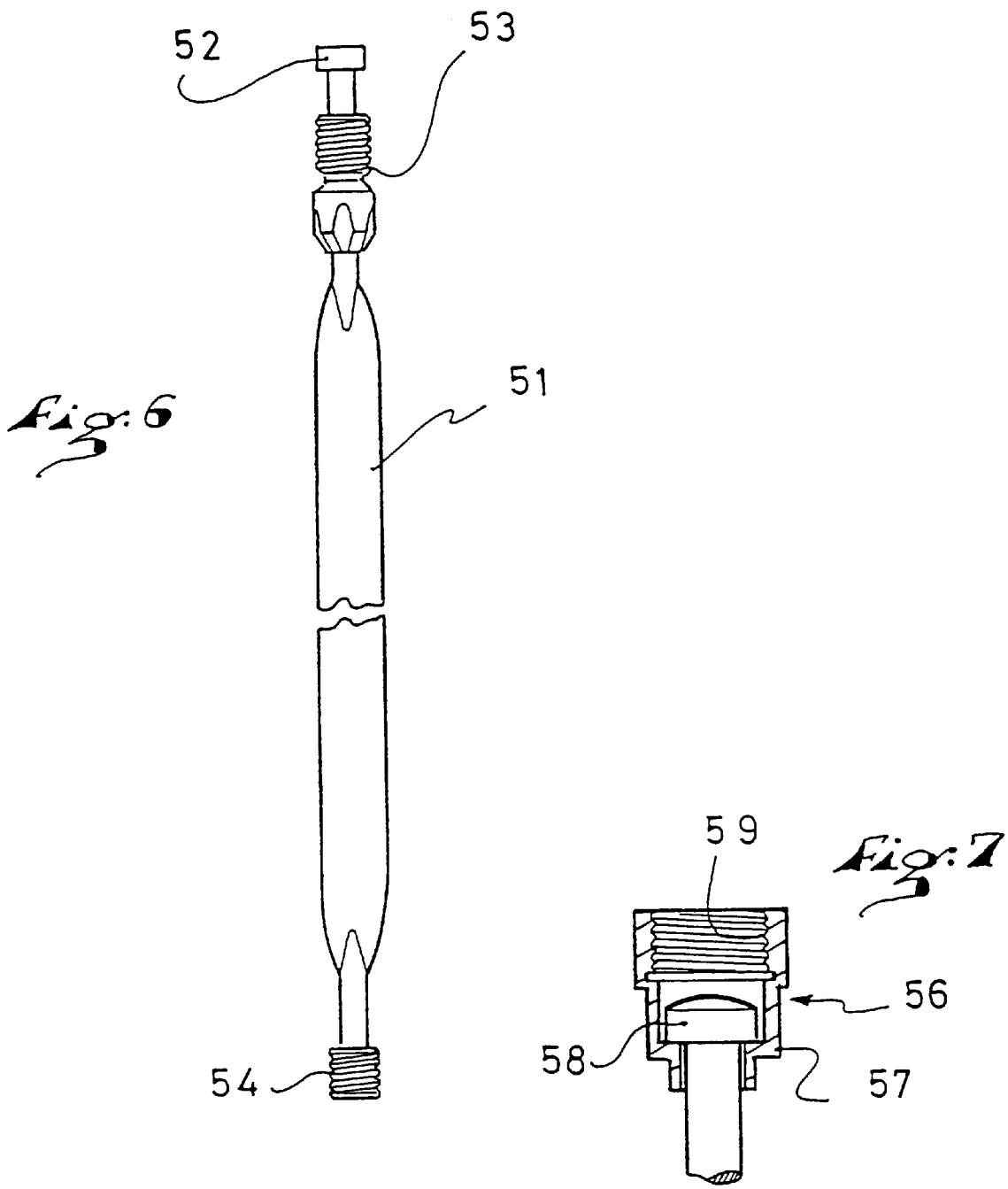

SPOKE FOR CYCLE WHEEL, CYCLE WHEEL, AND MANUFACTURING METHOD

BACKGROUND OF THE INVENTION

1. Field of the Invention

The present invention relates to a straight-type metal spoke for a cycle wheel. The invention also relates to a wheel equipped with such spokes.

The invention also relates to a method for making such a metal spoke for a cycle wheel, as well as a method for making a wheel having such spokes.

2. Description of Background and Relevant Information

Current commercially available metal spokes are made of stainless steel or zinc-coated steel. Such spokes have an elongated spoke body, with a head at one of the ends. In spokes of the straight type, the head is in the direct extension of the tapered body. The other end of the spoke is threaded, and it is provided to engage into a spoke nipple.

One of the main mechanical properties of a spoke is its elastic resistance and tractional rigidity. Another characteristic is its fatigue strength. Further, reference can be made to the weight that influences the inertia of the wheel, and the penetration into the air.

To improve the elastic resistance of the spoke, it is common to use a worked-hardened stainless steel. However, this has a disadvantage in that the shaping of the spoke is not carried out under good conditions. This shaping consists of forming the head, and if necessary, of flattening the filament to improve its penetration into the air. Indeed, because of the work hardening, only small sized heads can be obtained, which therefore have a limited bearing. This induces zones of very high stresses in the fastening zones, especially on the hub. Furthermore, their fatigue strength is not very good because of hairline cracks that may occur during shaping of the spoke.

Another disadvantage of the current spokes is that the spoke nipple which is used for fastening the spoke on the side of the rim is an independent element. Thus, the mounting of a spoke requires handling of two separate elements which must be presented on the rim from two different sides.

SUMMARY OF THE INVENTION

An object of the invention is to propose a spoke that is easier to shape.

More particularly, an object of the invention is to make it possible to obtain spokes having heads with a larger size.

Another object of the invention is to propose a spoke that has improved mechanical properties of elastic resistance and fatigue strength.

Yet another object of the invention is to propose a spoke which facilitates the mounting operations of the wheel.

Other objects and advantages will become apparent along the description that follows.

The metal spoke for a cycle wheel according to the invention has a tapered portion and two ends for fastening to a hub and to a rim, respectively. It is made from a heat treated light alloy, the tapered portion is smooth and free of any thread along its entire length, it has an enlarged head at each of its ends, and at least one recessed fastening end piece is freely pivotally mounted between the two enlarged heads.

The method for making a spoke for a cycle wheel according to the invention includes the following:

cutting a filament of predetermined length from a wire of light alloy with precipitation hardening in the annealed state, fitting on the segment a hollow screw made out of an alloy of the same grade as the alloy of the wire, punching both ends to form an enlarged head at each end of the segment, subjecting the assembly to tempering heat treatment.

According to another manufacturing mode, the method of the invention includes the following:

placing a wire or filaments of aluminum alloy in a solution at 475° C., cold water quenching, preserving in the solution-treated state, fitting of the hollow screw, shaping of both enlarged heads.

BRIEF DESCRIPTION OF DRAWINGS

The invention will be better understood with reference to the following description, and to the attached drawings which are an integral part thereof, wherein:

FIG. 1 shows a spoke in perspective according to the invention;

FIG. 2 shows a side view of a spoke according to an alternative embodiment of the invention;

FIG. 3 is a transverse cross-sectional view of the spoke of FIG. 2, taken along the line 3—3;

FIG. 4 schematically shows the spoke of FIG. 1 fastened to a rim and a rear hub, according to an embodiment of the invention;

FIG. 5 shows in the same manner the spoke of FIG. 1 fastened to a rim and a front hub, according to an embodiment of the invention;

FIG. 6 shows a spoke according to another embodiment of the invention; and

FIG. 7 illustrates a variation of the recessed screw.

DETAILED DESCRIPTION OF THE INVENTION

The spoke shown in FIG. 1 has a tapered body 1 whose cross-section is circular and substantially constant along the entire length.

At each end, the body has an enlarged head 2 and 3, respectively.

Preferably, and as shown, the head 2, provided to be located on the side of the rim has a cylindrical, or approximately cylindrical section, depending on its shaping mode.

The head 3 located on the side of the hub preferably has a non-cylindrical section, for example, in the form of a square-base flattened pyramid. The shape of the section is determined so as to prevent the rotation of the head when the spoke is tensioned.

A fastening end piece is formed as a hollow screw 5 provided for fastening the spoke on the side of the rim and for its tensioning. The screw 5 is slidably and pivotally mounted along the body 1. It has a threaded portion 6 that is provided to cooperate with a threaded opening of the rim and, set back therefrom, a screw head represented by a ribbed portion 7 provided to be coupled to an appropriate tool. The screw is traversed by a revolving cylindrical recess whose diameter is equal to the diameter of the body, except for the operational clearance. The screw 5 is provided to come into abutment against the head 2, and to pivot with respect to this head, so as to cause the progressive tensioning of the spoke between a hub and a rim.

The threaded portion of the screw is located on the side of the cylindrical head 2. The diameter of the head 2 is at most equal to the diameter of the threaded portion 6 in the thread depth, in order to enable the translation of the head 2 in the threaded opening provided for the screw 5. It must be noted that the assembly means here is the threaded portion of a screw fitted on the tapered body of the spoke. The diameter of the thread is substantially greater than that of a thread obtained directly on the tapered body of the spoke. Therefore, there is a lower concentration of the forces between the screw and the rim.

FIG. 2 shows an alternative embodiment. According to this embodiment, the lengthy portion 11 of the body has a profiled shape along a major part of its length. For example, this shape, which is visible in FIG. 3, is a preferably aerodynamical profile, like a drop of water or a wing of an aircraft, i.e., an airfoil section. As it will appear subsequently, the lengthy portion 11 can have, in cross-section, almost any shape, symmetrical or non-symmetrical. For example, there could be an aircraft wing profile incurved in a different manner depending upon whether the spoke is provided on the right or left side of the wheel. The section of the lengthy portion 11 can also vary progressively along its length, as a function of the distance from the hub and the rim.

In the vicinity of the cylindrical head 12, the section of the lengthy portion changes into a circular shape which it assumes along a length that is sufficient for the assembly and the free rotation of the recessed screw 15. This screw is similar to the previous screw 5. As in the preceding case, it is provided to come into abutment against the head 12.

At the other end, the lengthy portion is continuously connected to the non-cylindrical head 13 with, if necessary, a circular section along a short length immediately beneath the head. This length corresponds to the thickness of the wall of the hub.

The spokes according to the present invention are made out of a structure hardened light alloy, i.e., which is adapted to heat treatment.

This is, for example, a 7075 type of aluminum alloy, or from the 7000, 2000, or 6000 series. For example, one can use a 7093 alloy with 17% of B4C, having a density of 2.7, and an elastic modulus of 100,000 MPa (Megapascals), or a 2080 alloy with 17% of SiC, having a density of 2.82. One could also use a titanium alloy, for example, a Ti-6Al-4Va alloy, i.e., with 6% of aluminum and 4% of vanadium. Other alloys are also suitable.

In a first phase of an embodiment of the spoke, of the invention a wire is extruded from the alloy whose diameter is progressively reduced to the desired diameter for the spoke. This decrease in the diameter which causes work hardening of the material can be performed in several passes, with an intermediate annealing between two successive passes. The last pass is followed by an annealing.

Good results were obtained with a wire with a diameter of 2.7–3.15 millimeters. Of course, these values are provided only by way of example. It must be noted that the diameter of the tapered body is substantially greater than for a conventional stainless steel spoke, but the weight of the finished spoke is lower due to the difference in density. Indeed, by way of illustration, the density varies from 7.8 for a stainless steel to 4.5 for a titanium alloy, and 2.8 for an aluminum alloy. A greater diameter of the spoke improves the stiffness and torsional strength of the spoke. In other words, the spoke will be less inclined to twisting when tensioned by the rotation of the screw.

The thread obtained after drawing and annealing is cut according to filaments of predetermined length, greater than the desired length for the spoke. In view of the annealed state of the material, the shaping of the spoke can be obtained very easily. In addition, the deforming caused by this shaping only generates reduced internal tensions, which are significantly lower than for a conventional stainless steel spoke.

The shaping of the spoke consists of obtaining two heads, and if necessary, by changing the section of the tapered central portion.

Also due to the malleability of the material, spoke heads can be obtained which have dimensions and a volume substantially greater than for a conventional spoke. These greater dimensions reduce the concentration of the stresses mainly in the section replacement zones, i.e., beneath the heads. This improves the fatigue lifespan of the spoke. In addition, there are enlarged contact surfaces, on one side with the hub wall, and on the other side with the hollow screw. Contact pressures are therefore lower at the hub and at the rim.

Also, as this was described in relation to FIGS. 2 and 3, it is possible to shape the tapered central part of the spoke according to forms more or less complex, and possibly changing along the spoke, in particular aerodynamic forms with a leading edge and a trailing edge. Contrary to this, the current stainless steel spokes are merely flattened.

Consequently, one of the heads 2 or 3 is shaped, for example, by a punching operation with a punch. Shaping the head can be done in several phases, with different punches and different punching forces, in temperature conditions other than room temperature, if necessary, so as to have a head in the desired shape, and especially to have a progressive transfer of a section, without cracks, where the tapered body of the spoke and the head are joined.

In the following operation, the hollow screw 5 is fitted onto the spoke along the hollow portion, then the second head of the spoke is shaped.

The hollow screw is obtained by cold punching or by free-cutting in an alloy of the same grade as the filament, i.e., an alloy compatible with the same heat thermal treatments as or other treatments than the annealed filament.

The second head is shaped preferably in a die, so as to simultaneously adjust the length of the spoke to the desired length.

Shaping the tapered body is done by a die stamping operation, if necessary, in several passes in dies of progressive shapes.

To control the final length of the spoke as best as possible, this operation is done preferably before shaping the second head.

It must be noted that the order of the shaping operations of both of the two heads and the fitting of the screw is not important, as long as the screw is present before the punching of the second head. Two or more operations can also be done simultaneously with adapted tools.

Once the final shape is obtained, the spoke, with its tension screw, is subjected to a heat treatment which has the object of increasing the elastic resistance and the fatigue strength of the spoke.

The type of this heat treatment is known. Several treatment techniques are appropriate.

In the case of a spoke made of an aluminum alloy, according to a first method of treatment known as 7075, the spoke is placed in a solution at 465° C. for 20 minutes or less, then air-hardened or water-hardened. Next, the spoke is subjected to tempering 12–16 hours at 135° C., to reach a so-called T6 state.

According to another treatment known as T73, the spoke is subject to a first tempering at 108° C. for 6–8 hours, after the quenching, then a second tempering at 161° C. for 24–30 hours.

It is known that the first treatment favors the elastic resistance, the second the resistance to corrosion under stress. Other treatments are also appropriate depending on the nature of the alloy.

During the solution treatment, the internal residual tensions disappear.

The spoke has attained the desired mechanical properties when it passes the heat treatment stage. It can then be used as such or be subject to a complementary anodization treatment, when it is made of an aluminum alloy.

Anodization is known to be a treatment that hardens the surface material. Anodization also allows coloring the material.

In these conditions, the spokes can be anodized separately, which allows obtaining spoke colorings different than those of the rim.

According to another embodiment of the invention, since the rim is made of aluminum, and the hub body is also made of aluminum, the whole thing can be assembled then subject to a general anodization, the elements that are not made of an aluminum alloy, especially the bearings, being mounted later.

When the spoke is made of a titanium alloy, it is subject in the same way to a heat treatment with a quenching and tempering. Anodization is not necessary since the titanium alloy naturally has a good resistance to corrosion. The spoke can be colored during the heat treatment.

According to another manufacturing method of the spoke, a wire from an alloy is first cut up in filaments. These are then placed in a solution at 475° C. for 50 minutes, for example.

Next, it is hardened in cold water. The filament is then in a solution-treated state, i.e., it conserves its malleability and can be shaped during a predetermined time period following the hardening. This time period depends on the conservation temperature of the wire, and can last several days if the temperature is below 0°.

Cutting-up the wire in filaments can also be done at this stage. Shaping it is done as in the previous case: the head is shaped, the hollow screw is fitted, then the second head is shaped, followed by tempering at 175° C.

This manufacturing method is advantageous since the last tempering operation takes place at a relatively low temperature, and it does not risk causing a recrystallization of the alloy.

In addition, the hollow screw is treated separately. It can be subject to a different treatment, or be made of in a different alloy or a different material, for example, a material known as "Zamak," or brass, or steel. The spoke can also be anodized and/or colored before being fit onto the spoke body.

FIGS. 4 and 5 schematically show the assembly of a spoke according to the invention on rear and front hubs, respectively.

Given that the spoke has two heads, it is not possible to fit it into an opening. The head opposite of the screw is therefore held at the level of a notch. Since the spoke, the head in particular, has greater dimensions that a normal stainless steel spoke, the stresses are distributed over a larger surface at the level of the notch.

FIG. 4 shows a rear hub 16 with a hub body 17, a free wheel body 18, the whole assembly mounted in rotation around a shaft 19. The hub body 17 has a boss 20, 21 at each end. Each boss has a series of notches, oriented radially and parallel to the axial direction of the shaft 19. The notches 22a, 22b, 22c are visible for the boss 20; the notches 23a, 23b, 23c are visible for the boss 21.

Each notch has two cutouts made according to the diameter of the tapered body of a spoke. The cutouts are provided to retain two spokes in a spade-head position, as schematically shown for spokes 25 and 26 respectively engaged in the cutouts 24a, 24b. The spoke head retained by a notch is preferably non-cylindrical, as described previously. In these conditions, the base of the head is kept from pivoting by the notch base or possibly by small retaining teeth which are located at the top of the notch.

Such a hub is made in a relatively simple way. The notches are in fact made with the blank of the hub body, and the notches are made by the turning at the same time as the machining of the body.

A rim 29 provided to be associated with the spoke is represented in cross-section in FIG. 4. The rim 29 has an upper bridge 30, a lower bridge 31, and two lateral sides 32, 33 which extend beyond the upper bridge by the fastening wings of the tire. The upper bridge is devoid of openings, except the opening provided for the valve. For each spoke, the lower bridge is pierced by an opening, which, preferably, is made by extruding the material. In this way, a short tubular or chimney-like element 35 is formed, which is threaded according to the dimensions of the threaded portion of the screw 36.

The chimney obtained at the lower bridge has the advantage of not weakening the material in the area of the opening. Furthermore, the threading which allows the fastening of the spoke and its tensioning has dimensions much greater than a threading for a conventional spoke. By way of example, a spoke such as the spoke 25 was constructed with a threaded screw in the standardized M7 pitch. For a conventional spoke, the threaded portion has a diameter of 2 millimeters. Consequently, the stresses are much more distributed in the lower bridge of the rim.

It must also be noted that the spokes are tilted with respect to a radial direction. This is due, on the one hand, to their spade-head assembly, and, on the other hand, to the opening of the spoke set. To account for this, the chimneys 35 are tilted with respect to the median radial plane defined by the rim. In addition, as shown in FIG. 4, the spokes have a light bend near the hub, so that the end of the spoke located on the side of the hub presents itself along a direction parallel to the median radial plane defined by the rim. A shape of a notch can also be provided which would allow the spoke to take the right tilt.

FIG. 5 schematically shows a spoke 40 assembled to a front hub 41. The hub 41 has a hub body 43 rotatably mounted around a shaft 42. On each side, the hub body has a flange 44, 45 respectively, open outwardly, and closed by a cap 46, 47, respectively. Cutouts are made at the opening of the flanges. The opening of the cutouts correspond to the diameter of the tapered body of the spoke 40. The cutouts 48a, 48b, 48c, 48d, and 48e are visible for the flange 44, the notches 49a, 49b, 49c, 49d are visible for the flange 45. Here the assembly of the spokes is carried out by engaging the tapered body of each spoke in the notch, with the non-cylindrical head inside the flange. Next, the cup is positioned, after which the sets of bearings are adjusted. Advantageously, the non-cylindrical head is wedged against the cap and against an edge of the flange, which interferes with its rotation when the spoke is tensioned.

A rim 50 provided to cooperate with the spoke 40 is represented in FIG. 5. The rim is similar to the previously described rim 29, except for the orientation of the chimneys. Indeed, in the instant case, the spokes are parallel to planes of radial orientation, such that the openings 35 of the rim account only for the tilting of the spokes due to the opening of the spoke sets. It must also be noted that, preferably, in the area of the cutouts, the flanges have a surface that is tilted orthogonally to the direction taken by the spokes.

Once the spokes have been assembled on a front or rear wheel, the tensioning of the spokes and the adjustment of the wheel center are done according to a normal technique.

Advantageously, the rims 29 and 50, with their upper bridge exempt of openings, can be furthermore equipped with a tire assembled tubeless, i.e., without an innertube nor a rim base. Assembling the spokes made of a light alloy contributes to further reducing the weight and inertia of the finished wheel.

FIG. 6 shows a spoke provided with another fastening method.

The spoke has, as in the previous case, an elongated portion 51, possibly shaped, a first head 52 and a recessed screw 53.

The second head 54 has a diameter greater than the initial diameter of the elongated portion, and it is threaded. The second head 54 is, for example, shaped by a punching operation on the end of the wire, so as to enlarge its diameter, then it is threaded by a rolling operation, in order to improve its fatigue strength.

For example, from a wire 2.7 millimeters in diameter, the head 54 is threaded with an external diameter of 4.5 millimeters, and it has a height of 4 millimeters.

Heat treatment operations are the same as in the preceding case. The head 54 is provided to be tightly screwed in a threaded opening of the hub. Eventually, glue is added in the threads when screwing occurs.

Other head shapes could also be used, for example, shapes with lugs ensuring a quarter turn fastening or pins for a bayonet fastening.

Of course, the present description is only given by way of example, and other embodiments of the invention could be used without leaving the scope thereof. In particular, the spokes, according to the invention, could equip other constructions of the hub or the rim than those which were described.

Spokes that have two hollow screws, one at each spoke head, could also be made. In this case, the heads could substantially have the same shape.

A hollow nut 56 could also be used instead of a screw. Such a nut 56 is visible in FIG. 7. It has a cup 57 where the spoke head 58 is housed. The cup is pierced for the passage of the tapered portion, and it is threaded at its opening and has a thread 59. The nut is provided to be screwed onto a screw or onto a threaded rod portion.

Furthermore, the spokes can be made of alloys different than those mentioned.

The instant application is based upon the French Patent Application No. 97 10462, filed on Aug. 13, 1997, the disclosure of which is hereby incorporated by reference thereto in its entirety, and the priority of which is hereby claimed under 35 USC 119.

What is claimed is:

1. A metal spoke for a cycle wheel comprising a tapered body portion having a predetermined length and two ends respectively for fastening the spoke to a hub and a rim, wherein said tapered body portion, proximate said two ends has a diameter of at least 2.7 millimeters, wherein said tapered body portion is smooth and exempt from threading over an entirety of said length, wherein the spoke is made of a heat treated light alloy, wherein each of said ends comprises an enlarged head, and wherein at least one hollow fastening end piece is mounted in free rotation between said two enlarged heads.

2. A spoke according to claim 1, wherein said two heads of said ends of said spoke are punched.

3. A method for manufacturing a spoke for a cycle wheel having a tapered body portion with a predetermined length and two ends respectively for fastening the spoke to a hub and a rim, the tapered body portion, proximate the two ends, having a diameter of at least 2.7 millimeters, the tapered body portion being smooth and exempt from threading over an entirety of the length of the tapered body portion, the spoke being made of a heat treated light alloy, each of the ends having an enlarged head, and at least one hollow fastening end piece being mounted in free rotation between the two enlarged heads, wherein said method comprises the following:

cutting a filament of a predetermined length from a wire of light alloy with precipitation hardening in the annealed state, fitting on the filament a recessed screw made out of an alloy having the same grade as the alloy of the thread, punching both ends to form an enlarged head at each end of the segment, subjecting the assembly to tempering heat treatment.

4. A method according to claim 3, wherein said method comprises a complementary step for shaping the tapered portion.

5. A method according to claim 3, wherein said method comprises an additional anodization step.

6. A metal spoke for a cycle wheel comprising:

an elongated body portion and two opposite end portions, said elongated body portion and said end portions being made from a heat-treated light alloy, an entirety of said elongated body portion being smooth and non-threaded;

each of said two opposite end portions comprising an enlarged head and, proximate each of said enlarged heads, said elongated body portion having a circular cross section with a diameter of greater than or equal to 2.7 millimeters, one of said end portions being adapted to be fastened to a hub and another of said end portions being adapted to be fastened to a rim; and at least one hollow fastening end piece is mounted in free rotation between said enlarged heads of said opposite end portions.

7. A spoke according to claim 6, wherein said enlarged heads are formed by punching.

8. A spoke according to claim 6, wherein said hollow fastening end piece includes an externally threaded portion and an external ribbed portion, said ribbed portion being adapted to be coupled to a tool.

9. A spoke according to claim 6, wherein at least one of said enlarged heads has a non-cylindrical shape.

10. A spoke according to claim 6, wherein at least one of said enlarged heads is externally threaded to a diameter greater than a diameter of said elongated body portion.

11. A spoke according to claim 6, wherein said light alloy is an aluminum alloy.

12. A spoke according to claim 11 wherein said elongated body portion and said end portions are anodized.

13. A spoke according to claim 6, wherein said light alloy is a titanium alloy.

14. A spoke according to claim 6, wherein at least a part of said elongated body portion has an airfoil section.

15. A spoke according to claim 14, wherein said airfoil section varies in shape along said elongated body portion.

16. A spoke according to claim 6, wherein:

said circular cross section of said elongated body portion has a diameter of 2.7 to 3.15 millimeters.

17. A metal spoke for a cycle wheel, said metal spoke comprising:

an elongated body portion and two opposite end portions, said elongated body portion and said end portions being made from a heat-treated light alloy, said elongated body portion being smooth and non-threaded; and each of said two opposite end portions comprising an enlarged head and, proximate each of said enlarged heads, said elongated body portion having a circular cross section with a diameter of greater than or equal to 2.7 millimeters, one of said end portions being adapted to be fastened to a hub and another of said end portions being adapted to be fastened to a rim.

18. A spoke according to claim 17, wherein:

said circular cross section of said elongated body portion has a diameter of 2.7 to 3.15 millimeters.

19. A spoke according to claim 17, wherein said light alloy is an aluminum alloy.

20. A spoke according to claim 19, wherein said elongated body portion and said end portions are anodized.

21. A spoke according to claim 17, wherein said light alloy is a titanium alloy.

22. A spoke according to claim 17, wherein at least a part of said elongated body portion has an airfoil section.

23. A cycle wheel comprising:

a rim;

a hub;

said rim and said hub being connected by a plurality of spokes, said rim including a plurality of threaded openings, each of said plurality of spokes comprising:

an elongated body portion and two opposite end portions, said elongated body portion and said end portions being made from a heat-treated light alloy, an entirety of said elongated body portion being smooth and non-threaded;

each of said two opposite end portions comprising an enlarged head and, proximate each of said enlarged heads, said elongated body portion having a circular cross section with a diameter of greater than or equal to 2.7 millimeters;

a first of said two end portions of each of said spokes being fastened to said hub;

for each of said spokes, at least one hollow fastening end piece mounted in free rotation about a second of said end portions and between said enlarged heads of said two opposite end portions, said hollow fastening end piece having external threads;

a second of said two end portions of each of said spokes being fastened to said rim by means of said external threads of said hollow fastening end piece being engaged with a respective one of said threaded openings of said rim.

24. A wheel according to claim 23, wherein said hub has a plurality of cutouts, each of said cutouts having an opening, each of said openings having a width corresponding to a diameter of said elongated body portion of each of said spokes.

25. A wheel according to claim 23, wherein:

said circular cross section of said elongated body portion has a diameter of 2.7 to 3.15 millimeters.

26. A wheel according to claim 23, wherein said light alloy is an aluminum alloy.

27. A wheel according to claim 26, wherein said elongated body portion and said end portions are anodized.

28. A wheel according to claim 23, wherein said light alloy is a titanium alloy.

29. A wheel according to claim 23, wherein at least a part of said elongated body portion has an airfoil section.

\* \* \* \* \*